United States Patent [19]

Urbansky

[11] Patent Number: 5,343,476
[45] Date of Patent: Aug. 30, 1994

[54] TRANSMISSION SYSTEM FOR THE SYNCHRONOUS DIGITAL HIERARCHY

[75] Inventor: Ralph Urbansky, Schwaig, Fed. Rep. of Germany

[73] Assignee: U. S. Philips Corporation, New York, N.Y.

[21] Appl. No.: 148,017

[22] Filed: Nov. 5, 1993

Related U.S. Application Data

[63] Continuation of Ser. No. 857,358, Mar. 25, 1992, abandoned.

[30] Foreign Application Priority Data

Apr. 4, 1991 [DE] Fed. Rep. of Germany ....... 4110933

[51] Int. Cl.⁵ .................... H04J 3/06; H04L 7/04
[52] U.S. Cl. ..................... 370/102; 370/108; 375/112; 375/118; 369/60; 365/189.05
[58] Field of Search ............... 370/58.1, 58.2, 58.3, 370/60, 60.1, 79, 82, 83, 84, 94.1, 94.2, 99, 100.1, 102, 105.1, 108, 110.1, 111, 112; 375/111, 112, 118; 369/60; 365/189.01, 189.04, 189.05

[56] References Cited

U.S. PATENT DOCUMENTS

| | | |
|---|---|---|
| 4,791,652 | 12/1988 | McEachern et al. ............ 375/112 |
| 4,811,340 | 3/1989 | McEachern et al. ............ 370/102 |
| 4,891,788 | 1/1990 | Kreifels ....................... 375/118 |
| 4,928,275 | 5/1990 | Moore et al. ................. 370/102 |
| 5,123,010 | 6/1992 | Pospischil .................. 370/110.1 |
| 5,131,013 | 7/1992 | Choi .......................... 375/118 |
| 5,157,655 | 10/1992 | Hamlin, Jr et al. ............ 370/102 |
| 5,168,494 | 12/1992 | Mueller ....................... 370/84 |

FOREIGN PATENT DOCUMENTS 4018687 1/1991 Fed. Rep. of Germany .

OTHER PUBLICATIONS

"Jitter bei der Ubertragung plesiochroner Signale in der SDH", by Miguel Robledo and Ralph Urbansky, PKI Techn. Mitt. Mar. 1989, pp. 31–38.
CCIT Recommendation G707, G708, G709, pp. 107–173.

Primary Examiner—Alpus H. Hsu
Attorney, Agent, or Firm—David R. Treacy

[57] ABSTRACT

A digital transmission system having at least one adaptation circuit for compensating for phase variations of a STM-N signal. For inserting justification locations for at least one container of the STM-N signal, the adaptation circuit (8) includes a buffer (17, 51), a write address generator (16, 53), a read address generator (18, 61) a justification decision circuit (24, 60) and an output circuit (19, 62). The buffer stores container data in which justification locations may be inserted. The write address generator provides write addresses for data to be written in the buffer, and the read address generator provides read addresses in the buffer. In one embodiment differences between the read and write address values are combined with justification information which has been low pass filtered. In another embodiment these differences are low pass filtered and used for forming the justification decision signal. The output circuit inserts positive or negative justification locations in data read from the buffer to form the container.

25 Claims, 9 Drawing Sheets

TRANSMISSION SYSTEM FOR THE SYNCHRONOUS DIGITAL HIERARCHY

This is a continuation of co-pending application Ser. No. 07/857,358, filed Mar. 25, 1992, now abandoned.

CROSS-REFERENCE TO RELATED APPLICATIONS

This application is related to the subject matter of applicant's co-pending application Ser. No. 07/848,613.

BACKGROUND OF THE INVENTION

The invention relates to a transmission system for the synchronous digital hierarchy, comprising an adaptation circuit for compensating for phase variations of an STM-N signal.

In such a transmission system for the synchronous digital hierarchy, plesiochronous signals are combined by means of multiplexing and transmitted over an optical transmission path. Two digital signals are called plesiochronous when their bit rates deviate from the nominal value within given tolerance limits. The signals are combined according to a certain pattern and structured in frames. An example is the referenced synchronous transport module STM-N, specifically described in the CCITT Recommendations "Recommendation G.707, G.708 and G.709".

The structure of an STM-1 frame is diagrammatically represented in FIG. 1a. The frame comprises 270 columns and 9 rows. Each column of a row contains 1 byte. The rows 1 to 3 and 5 to 9, in the columns 1 to 9 accommodate the so-called Section Overhead (SOH) for control and error detection information signals, the fourth row of columns 1 to 9 accommodates an Administrative Unit referenced AU pointer (AU-P), and the remaining columns and rows accommodate the actual useful information referenced "STM-1-Payload" (P). As shown in FIG. 1b, the STM-1-Payload accommodates, for example, a Virtual Container VC-4 consisting of a Payload and a Path Overhead (POH). A container is here to be understood as the basic unit of payload. Such a container may comprise still further containers.

A state-of-the-art multiplexing structure for the STM-N frames is shown in FIG. 2. For example, C-4 data of a payload are inserted into a container at a bit rate of 140 Mbit/s. The addition of the POH renders the container C-4 into a virtual container VC-4. The addition of justification bytes and further bytes renders the virtual container VC-4 into an administrative unit AU-4. The container VC-4 may also be formed by a combination of several containers C-12. Data of a payload are inserted into such a container C-12 at a bit rate of 2 Mbit/s. The addition of a POH renders such a container C-12 into a virtual container VC-12. The virtual container VC-12 becomes a tributary unit TU-12 as a result of the addition of justification bytes and further bytes. These TUs are combined to groups TUG-2 and TUG-3 respectively.

STM-N signals are transmitted over a transmit path which comprises circuits at certain distances in which circuits, for example, a clock recovered from the STM-1 signal is adapted to a locally standardized clock. Even when various signals to be transmitted are combined to a single STM-N signal (for example, four STM-1 signals are combined to one STM-4 signal), their clocks are adapted to one another. On the receiver side of the transmission system, at the end of the optical transmit path, the STM-N signal is again subdivided into separate signals with a lower bit rate.

When a plurality of STM-1 signals are combined to one STM-4 signal and clocks in a regenerator circuit are adapted, problems of clock alignment may occur, as is described, for example, in the paper entitled "Jitter bei der Übertragung plesiochroner Signale in der SDH" by M. Robledo and R. Urbanski, PKI Techn. Mitt. 3/1989, pp. 31 to 38. As a result of phase wander or slight frequency deviations, the individual clocks of the various STM-1 signals are no longer adapted to one another. A clock alignment is effected by means of a byte justification method. According to this method predetermined positive or negative justification locations are filled with justification bytes. With a positive justification opportunity the payload is omitted from the justification location. This justification location otherwise carries a payload. With a negative justification opportunity a payload is transmitted in the justification location. This justification location otherwise carries no payload. A justification opportunity is also denoted a pointer action.

After a plurality of adaptation circuits in which clocks are adapted have been passed through, an increasing number of pointer actions may occur. This may result in an overflowing buffer on the receiver side of the transmission system when this buffer has not been selected sufficiently large. Data loss will then occur. The buffer in a circuit on the receiver side of the transmission system is used for adapting the data to the local clock. For example, a plurality of successive justification locations might occur, causing the buffer to overflow. In order to avoid such an overflow, the buffer could be selected large enough. However, this is undesired because the overall transmission system is consequently extended and the delay of the data increased.

SUMMARY OF THE INVENTION

It is an object of the invention to provide a transmission system for the synchronous digital hierarchy of the type mentioned in the opening paragraph, in which buffer overflow on the receiver side of the transmission system is avoided even when clustering of pointer actions occurs.

In a first solution for the transmission system of the type mentioned in the opening paragraph this object is achieved, in that the adaptation circuit for inserting justification locations comprises for at least one container of the STM-N signal a buffer for writing and reading data of the container, a write address generator for forming write addresses for the data to be written and a read address generator for forming read addresses for the data to be read out, a justification decision circuit for forming a justification signal which is a combination of difference values of the addresses of the write and read address generators and low-pass filtered values from values containing the justification information of the container data to be written, and an output circuit for forming negative or positive justification locations in the container in response to the justification signal and for forming an output signal from the data stored in at least one buffer.

In a second solution for a transmission system of the type mentioned in the opening paragraph this object is achieved, in that the adaptation circuit comprises for inserting justification locations for at least one container of the STM-N signal a buffer for writing and reading data of the container, a write address generator for forming write addresses for the data to be written and a read address generator for forming read addresses for the data to be read out, a justification decision circuit for forming low-pass filtered difference values from the addresses of the read and write address generators and for forming a justification signal from the low-pass filtered difference values, and an output circuit for forming negative or positive justification locations in the container in response to the justification signal and for forming an output signal from the data stored in at least one buffer.

The transmission system comprises an adaptation circuit by which justification opportunities are controlled. In this respect the adaptation circuit comprises at least a buffer in which the data of a container are written and from which data are read out. When data are written, they are written in the buffer under the write addresses generated by a write address generator. A read address generator supplies read addresses to the buffer. The data stored under the read address are then read from the buffer.

In the first solution the information whether a positive, negative or no justification location for a container is present is taken from the data to be written. This justification information is filtered by a low-pass falter, so that with high-frequency pointer actions i.e. frequent pointer actions, there is an effect that they are uniformly distributed over time. A large time constant of the low-pass filtering should be selected. With this type of low-pass filtering only the pointer actions are taken into account which originate from the preceding adaptation circuit in the transmission system. Subsequent to the low-pass filtering, difference values are added to the low-pass filtered values. The difference values are formed by means of a subtraction between the read and write addresses. The values resulting from the addition are used for deciding whether a justification signal is generated.

The justification signal is provided for denoting a negative or positive justification location. It is formed when the specific values are exceeded or fallen short of. On the basis of the data stored in the buffer an output circuit produces an output signal which may comprise negative or positive justification locations. If positive justification is to be performed, data are not read out during one clock signal, and if negative justification is to be performed, data are inserted into a justification location which otherwise cannot carry a payload.

In the second solution the difference is formed between the write and read addresses. The resultant difference values are low-pass filtered. The difference values contain the information whether a positive or negative or no justification location is present for a container. On the one hand, the information is contained therein whether a pointer action took place in the preceding adaptation circuit. On the other hand, the difference values still contain the information about the phase difference between the clock signals on the read and write sides of the adaptation circuit. The low-pass filtering of the difference values ensures that the effects of frequent pointer actions are uniformly distributed over time. The time constant of this low-pass filtering should also be selected large. The time constant of the low-pass filtering is to comprise a plurality of frames. Difference values supplied at a later instant have a larger effect on the values resulting from the low-pass filtering than difference values that have been supplied at earlier instants. The low-pass filtering is not to be understood as an arithmetical averaging, for which the difference values are added together while being given the same value over a specific period of time but, for example, an exponential averaging for which the difference values supplied at later instants—as observed hereinbefore—have a greater effect on the averaging. During the low-pass filtering there is an essentially constant variation in the pass-band and then a drop by at least 20 dB/decade.

In both solutions there is achieved on the basis of the low-pass filtering that the pointer actions are distributed more uniformly over the data stream and that, consequently, the buffer in the circuit on the receiver side of the optical transmission path need not exceed a specific size.

An embodiment for low-pass filtering according to the first solution is realised, in that for the low-pass filtering in the justification decision circuit the newly arriving values and feedback values are added together, the added values are buffered at least once per four-frame time interval, the buffered values are multiplied by a first factor so as to form the feedback values and are multiplied by a second factor so as to form the low-pass filtered values. If discrete building blocks are used for the embodiment, the addition is effected in an adder, the buffering in a register and the multiplications in a multiplier. The first factor may have the value of 15/16 and the second factor the value 1/16.

A further embodiment for low-pass filtering according to the first solution is realised, in that for the low-pass filtering in the justification decision circuit a counting operation is performed in which a count is made at least once per two-frame time interval, in which the counting direction during one time interval depends on the justification information and during another time interval depends on the sign of the count, and in which the count represents a low-pass filtered value. If such a low-pass filtering is performed with discrete building blocks, a low-pass filter comprises a counter at whose clock input a clock is available that lasts half a frame and at whose count direction input either the justification information or the sign of the count is available, for example, via a change-over switch.

An embodiment for low-pass faltering according to the second solution is realised, in that for the low-pass filtering in the justification decision circuit, the difference values multiplied by a third factor are added to a feedback value at least once per four-frame time interval during the forming of a read address the added values for forming low-pass filtered values are accumulated and multiplied by the negative third factor for forming the feedback value. If the low-pass filtering is performed with discrete building blocks, the difference values are multiplied by a third factor which has the value of 1/16, the addition being performed with an adder and the accumulation with an accumulator. The multiplication in the feedback path is performed by means of a multiplier which multiplies the output value of the accumulator by a factor of $-1/16$. The feedback value is applied to the adder at least once per four-frame time interval.

In an adaptation circuit a clock adaptation is effected between the clock derived from the newly arriving data (STM-N) signal and the local clock. Clock fluctuations cause pointer actions to occur. Once the STM-N signals have passed through the transmission path, the justification bytes are again to be removed on the receiver side of the transmission system. Subsequently, the payload is to be distributed uniformly so that the phase variation of the clock signal allocated to the useful byte is capable of satisfying the CCITT requirements as to jitter. Jitter is understood to mean the deviation of clock edges from their nominal positions. When the data are distributed uniformly, a buffer and a phase-locked loop on the receiver side of the transmission system are used. Especially high-frequency spectral portions in the jitter can be reduced by means of the low-pass filter property of the phase-locked loop. If, subsequent to the subtraction and low-pass filtering, the decision whether positive, negative or no justification at all is to be used is made only by means of a comparator, low-frequency spectral portions in the jitter may occur which cannot be reduced with simple means on the receiver side. For this purpose, there is provided that the justification decision circuit is used for calculating the mean value of the resultant low-pass filtered and difference values over a specific period of time and for forming a justification signal as a function of the mean value. The mean value is calculated of the values resulting from the low-pass filtering and subtraction over a specific period of time. The resultant mean value is used for deciding whether negative, positive or no justification at all is to be used. The calculation of the mean value may last, for example, one row period or a frame period or a multiple thereof.

In a further embodiment of the invention there is provided that in the justification decision circuit, subsequent to the low-pass filtering and subtraction over a specific period of time, the resultant low-pass filtered and difference values are accumulated for calculating the mean value after which the mean value is compared with two given peak values, and in that the justification decision circuit is provided for producing a negative justification signal so as to form a negative justification location when the mean value is smaller than the lower peak value, and for producing a positive justification signal when the mean value is larger than the upper peak value. If discrete building blocks are used for realising this further embodiment, the difference values are accumulated in an accumulator and in a comparator the mean values are compared with two given peak values. The two peak values are selected so that a clock adaptation may adequately be made with the aid of the available justification locations. A further reduction of the low-frequency spectral portions of the jitter is achieved in that in the justification decision circuit values of a cyclic number sequence or a random sequence are accumulated in addition to the accumulation of the resultant low-pass filtered and the difference values. The cyclic number sequence or a random sequence may be realised by means of a counter and, if necessary, a decoder. Because values of a cyclic number sequence or a random sequence are additionally accumulated, justification operations causing the low-frequency spectral portions of the jitter to be reduced even more are performed more often.

A further reduction of the low-frequency jitter relative to the preceding embodiment is achieved, when the justification decision circuit is provided for forming a zero subtraction result with a half full allocated buffer, for multiplying the negative and positive justification signals by a fourth factor and for accumulating at least one value multiplied by a fourth factor with a resultant low-pass filtered and difference value. This once again increases the number of justification opportunities. The negative and positive justification signals may be multiplied by a fourth factor in a multiplier when the justification decision circuit is realised in discrete building blocks. The fourth factor may then, for example, be a value of about 2.

In the second solution the mean value is already calculated during filtering, so that a subsequent accumulation may be omitted. In that case a register is to be substituted for the accumulator.

By way of the write and read address generators the low-pass filtering influences the justification decision relating to the clock adaptation in the adaptation circuit. In order to reduce this influence, in the justification decision circuit the negative or positive justification signals multiplied by a fifth factor are added to the difference values multiplied by a third factor and to the feedback values.

The embodiments for the justification decision circuit described thus far may also be realised by means of a processor building block.

For the justification operation of a VC-4 container, only a buffer, a write and a read address generator and a justification decision circuit are necessary. For example, if justification operations are to be carried out with VC-12 containers, the adaptation circuit comprises 63 buffers, 63 write and read address generators and 63 justification decision circuits. If a VC-4 container carries only VC-12 containers, their number is 63. The number of buffers, the number of write and read address generators and the number of justification decision circuits thus depend on the number of containers provided for insertion of the justification locations. As regards justification operations with VC-12 containers it should be observed that according to the CCITT Recommendations two consecutive justification operations are to be at least 16 STM-1 frames apart.

Write addresses for the buffer may not be generated until a payload is present in a buffer allocated to a container. An input circuit is selected for this purpose, which is provided for producing a write clock signal on the basis of an input clock signal for at least one write address generator constituted by a write counter, which input clock signal is derived from the STM-N signal, and is provided for producing write clock pulses only if data of the container allocated to the write address generator are present. If justification operations were performed only for a VC-4 container, it is necessary to produce a write clock signal for a write counter. However, if justification operations are performed for VC-12 containers, it is necessary that 63 write clock signals be formed for 63 write counters.

Read addresses for the buffer may not be generated until a payload is to be read from a buffer allocated to a container. This is the task of the output circuit. This circuit is provided for producing a read clock signal on the basis of an output clock signal generated by an oscillator for at least one read address generator formed by a read counter, and provided for producing read clock pulses only if data of the allocated container occur which data are provided for reading the buffer allocated to the read address generator.

The output circuit is further provided for producing a read clock signal if a negative justification signal occurs and for interrupting the read clock signal production if a positive justification signal occurs.

Exemplary embodiments of the invention will be further explained hereinbelow with reference to the drawing Figures.

DESCRIPTION OF THE PREFERRED EMBODIMENTS

Figure 1A:
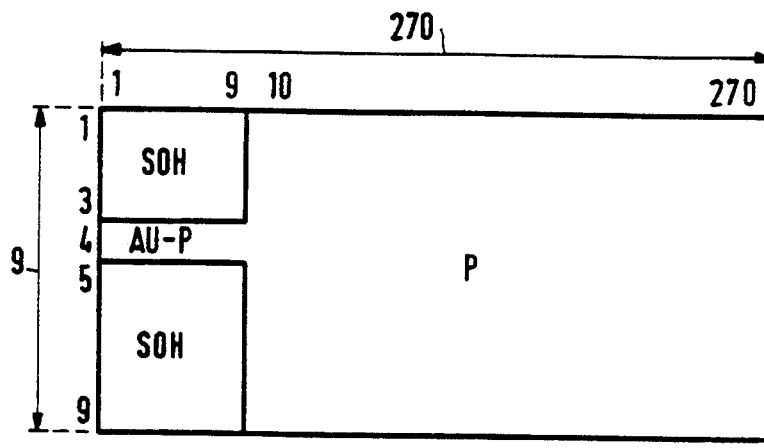
FIG. 1a and 1b gives a diagrammatic representation of the STM-1 frame comprising a VC-4 container.
Figure 1B:
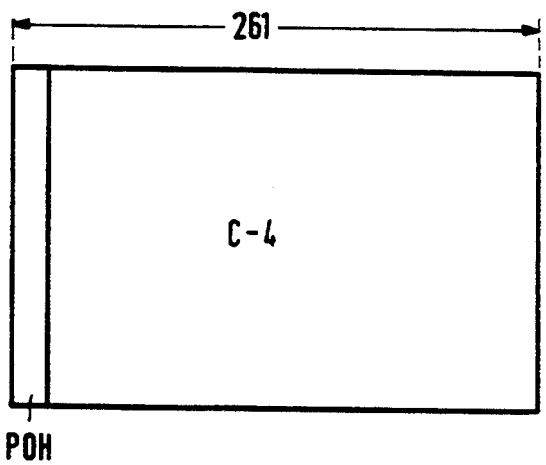
Figure 3:
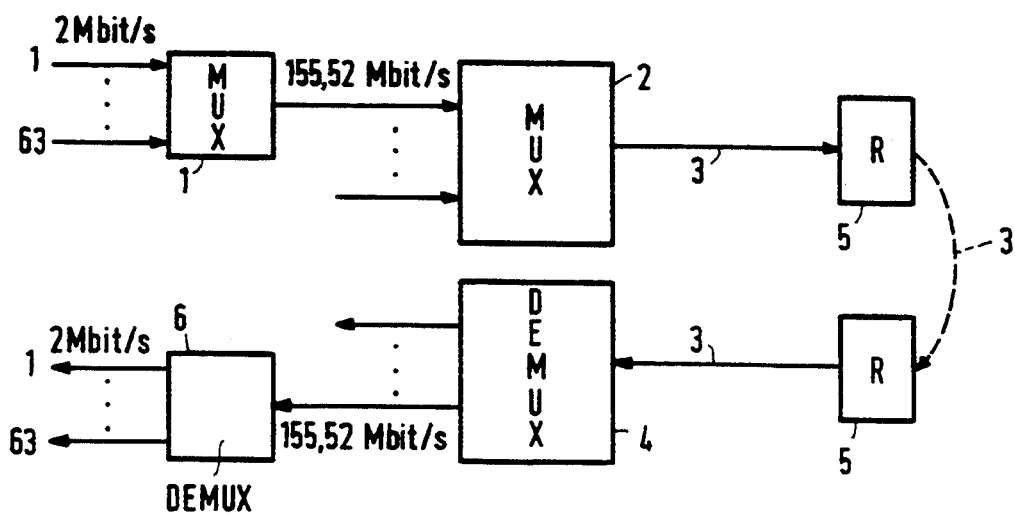
FIG. 3 shows a block diagram of a transmission system for the synchronous digital hierarchy.
Figure 2:
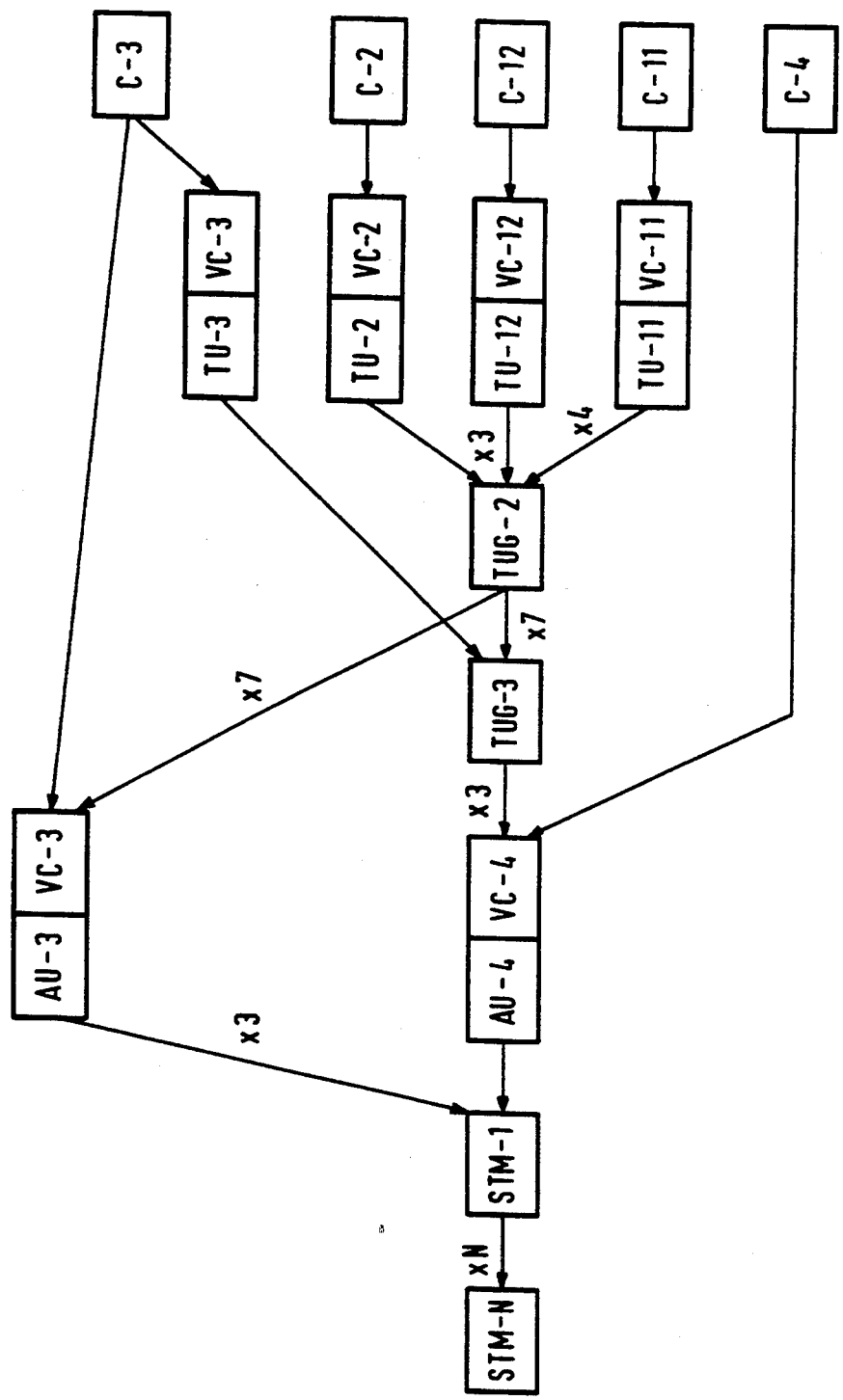
FIG. 2 shows a multiplex structure in the synchronous digital hierarchy.

The transmission system represented in FIG. 3 for the synchronous digital hierarchy comprises a transmission circuit 1 which combines the 63 2-Mbit/s signals to a 155.52 Mbit/s signal. These signals are then combined to a VC-4 container represented in greater detail in FIG. 1. The transmission circuit 1 thus produces an STM-1 signal. In a circuit 2 a total of four STM-1 signals are combined to an STM-4 signal, which is transported over an optical transmission link 3 to a circuit 4 which forms four STM-1 signals from the STM-4 signal. In the optical transmission link 3 circuits 5 are inserted for which there is also clock adaptation. An STM-1 signal is applied to a receive circuit 6 which produces 63 2-Mbit/s signals from the 155.52 Mbit/s signal (STM-1 signal).

Figure 4:
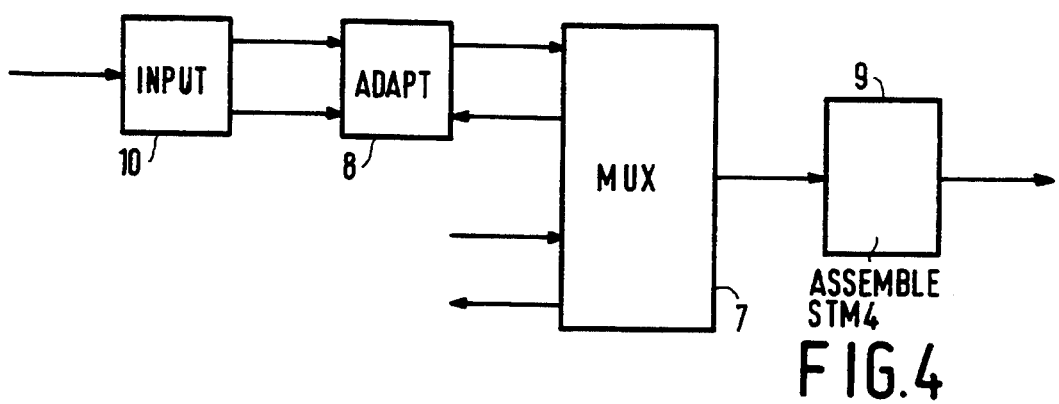
FIGS. 4 and 5 show block diagrams of parts of the transmission system shown in FIG. 3.

FIG. 4 shows a part of the circuit 2. Four STM-1 signals from adaptation circuits 8 are applied to a multiplexer 7. The multiplexer forms one STM-4 signal from four 155.52 Mbit/s signals which are produced by adaptation circuits 8. FIG. 4 shows only a single adaptation circuit 8 for simplicity. The adaptation circuit 8 is used for eliminating phase variations and minor frequency deviations which occur between a clock signal derived from the input signal of the adaptation circuit 8 and a clock signal derived from a separate oscillator. The adaptation circuit 8 is supplied with the oscillator clock signal by way of the multiplexer 7. Before the adaptation circuit 8 there is another circuit 10 which is used for clock recovery, error detection and descrambling. The clock recovered from the supplied STM-1 signal is applied to the adaptation circuit 8 over a further line. Once the four STM-1 signals have been combined in the multiplexer 7, they are, in circuit 9, coupled to a clock, scrambled and SOH mapping is effected. As observed in the description of FIG. 1, SOH is understood to mean a Section Overhead. This is the part of the STM-1 frame that carries control and error detection information signals.

Figure 5:
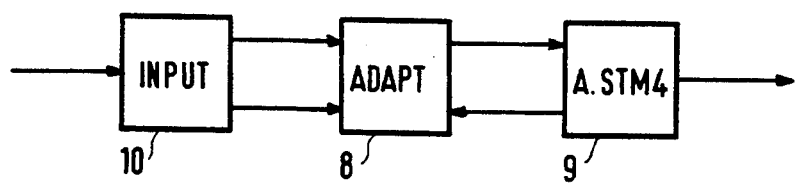

A similar circuit to the one described with respect to FIG. 4 is also used for a circuit 5. Such a circuit is represented in FIG. 5. It also comprises a circuit 10 which is used for clock recovery, error detection and descrambling. The circuit 10 supplies to the adaptation circuit 8 following in the circuit a clock signal recovered from the data supplied to circuit 10. The adaptation circuit 8 is followed by the circuit 9. The latter supplies a clock signal derived from a separate oscillator to the adaptation circuit 8. In the circuit 9 the data supplied by adaptation circuit 8 are combined with a clock, scrambled and SOH-mapped.

Figure 6:
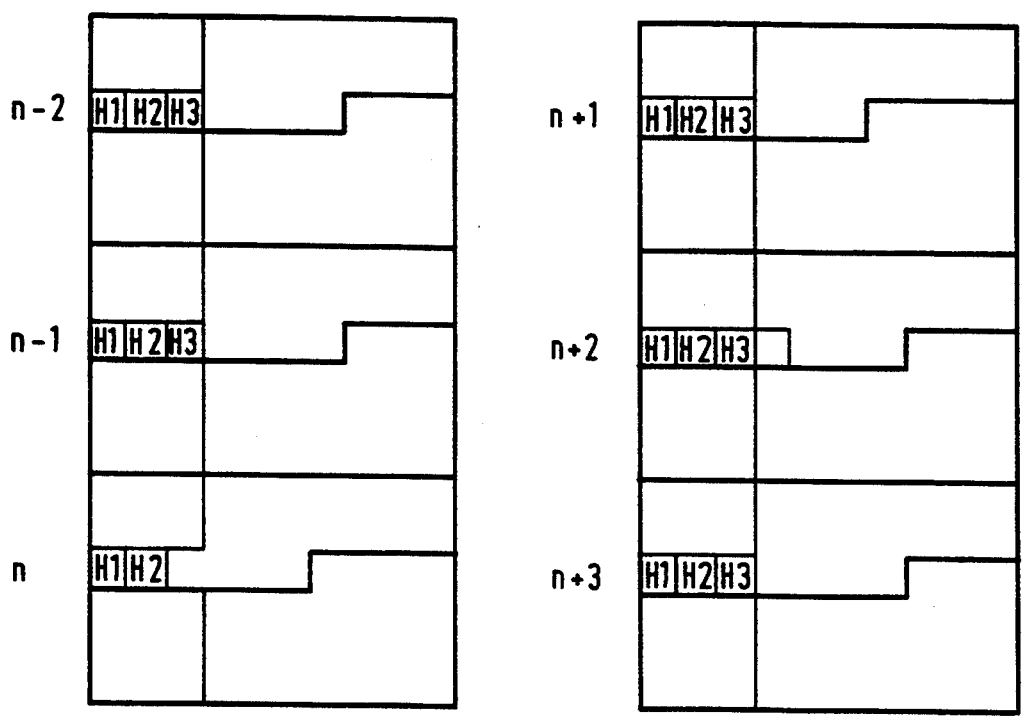
FIG. 6 shows a plurality of STM-1 frames with negative positive justification opportunities for a VC-4 container.

The adaptation circuit 8 inserts negative or positive justification bytes at predetermined justification locations so as to eliminate the phase variations. Such a justification operation for the STM-1 frame is explained in the following with reference to FIG. 6. In an STM-1 frame, a VC-4 container may commence in the payload area P (STM-1 payload) at a plurality of predetermined locations. The instant when such a VC-4 frame commences is stated in two first areas H1 and H2 of the administrative unit AU-P. Each VC-4 container commences with a byte referenced "J1". If no justification is to take place, the third area H3 of the administrative unit AU-P carries three informationless bytes. This identifies the transition of the two frames n−2 and n−1 in FIG. 6. In the case of a negative justification opportunity, as shown in frame n of FIG. 6, a payload is transmitted in the justification location which otherwise carries three bytes of H3. In the case of a positive justification opportunity, as shown in the frame n+2 of FIG. 6, payload is left out from the three bytes following the area H3.

Figure 7:
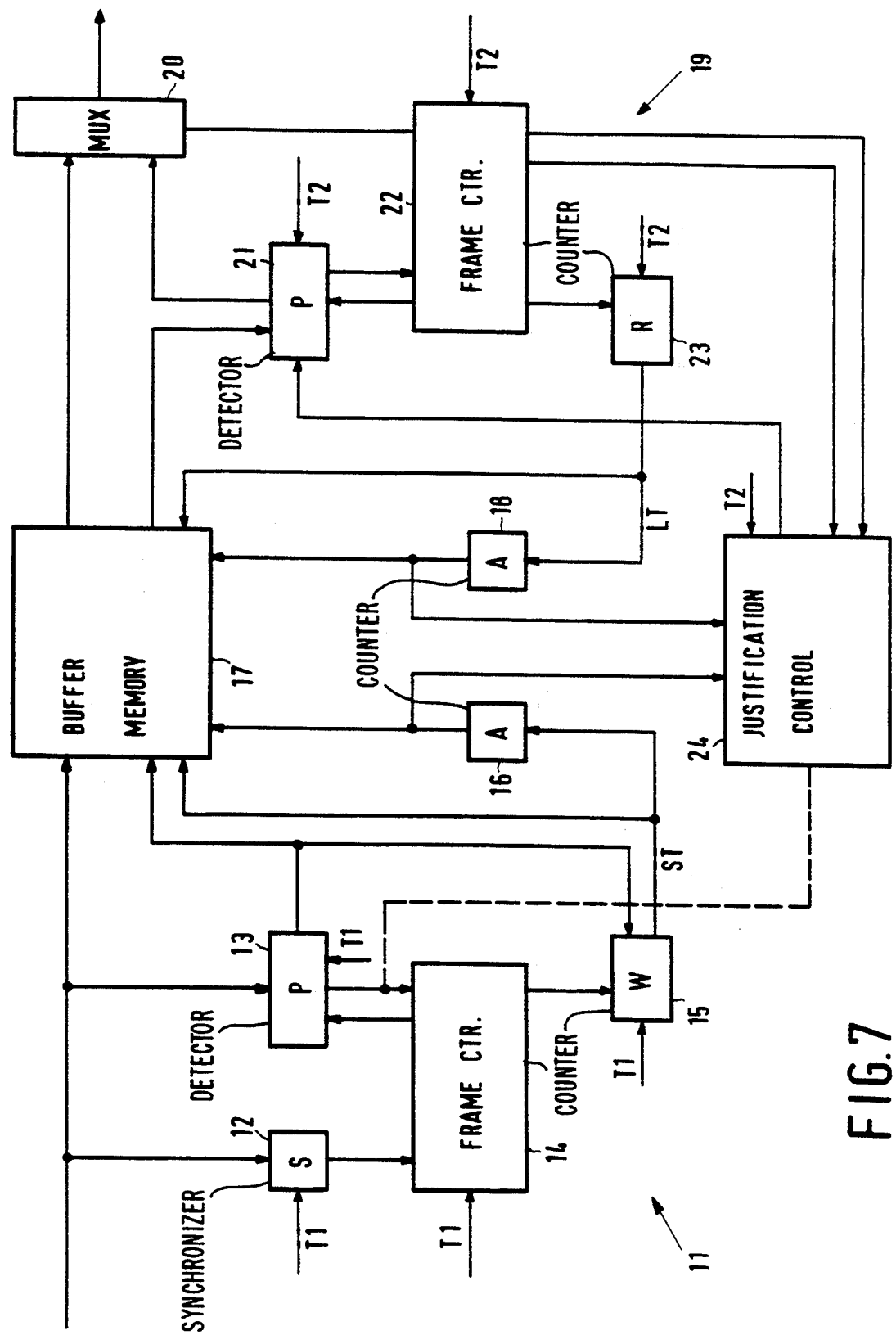
FIG. 7 shows a first exemplary embodiment of an adaptation circuit used in FIG. 4 or 5, FIGS. 8 to 13 show justification decision circuits or parts thereof which can be used in FIG. 7, FIGS. 14a to 14d show the structure of the VC-12 container in a VC-4 container.

FIG. 7 shows a first exemplary embodiment for an adaptation circuit 8. An input circuit 11 comprising a first synchronizing circuit 12, a first detection circuit 13, a first frame counter 14 and a second frame counter 15, is supplied with an input clock signal T1 and data of an STM-1 signal. The first synchronizing circuit 12 determines the beginning of an STM-1 frame on the basis of a plurality of bytes found at the head of each STM-1 frame. Once the first synchronizing circuit 12 has recognized the beginning of an STM-1 frame, the first frame counter 14 is set to its starting position. This first frame counter 14 is incremented with each byte of an STM-1 frame. The first frame counter 14 starts and stops the second frame counter 15 which does not produce a write clock signal ST until data of the VC-4 container are present. The first frame counter 14 further controls the first detection circuit 13 to which the bytes in the areas H1 and H2 are applied. The first detection circuit 13 recognizes the beginning of a VC-4 container on account of the contents of the areas H1 and H2 and applies a pulse to the second frame counter 15 at the beginning of such a VC-4 container, which pulse counter 15 then sets its counter to an initial count. The bytes of the areas H1 and H2 also contain the information whether a negative or positive justification location occurs. The first detection circuit 13 passes such information about a negative or positive justification location on to the first frame counter 14 which then causes the second frame counter 15 to start earlier or later. In the case of a negative justification location, the second frame counter 15 is started earlier, because payload is present in the justification location. In the case of a positive justification location the second frame counter 15 is started later.

The second frame counter 15 applies its produced write clock signal ST to a write address generator 16 which consists of a write counter. With each write clock signal ST the write address generator 16 generates a write address under which the associated payload (in the VC-4 container) is written in a buffer 17. The buffer 17 is supplied with the write clock signal ST in addition to the payload of the STM-1 signal. The buffer 17 is also supplied with a marker which identifies the beginning of a VC-4 container and is produced by the first detection circuit 13. This marker is accommodated in the address which identifies the first payload of a VC-4 container.

For reading the data from the buffer 17 it is necessary for the read addresses and a read clock signal LT to be generated. Read addresses are generated by a read address generator 18 which is constituted by a read counter to which the read clock signal LT is applied from an output circuit 19. Payloads are read from the buffer 17 with each read clock signal LT and applied to a multiplexer or change-over switch 20. The output circuit 19 comprises a second detection circuit 21, a third frame counter 22 and a fourth frame counter 23, to which elements an oscillator output clock signal T2 is applied as is described in FIG. 4. The duration of a clock period of the output clock signal corresponds, in essence, to the duration of one byte in the STM-1 frame. The third frame counter 22 starts and stops the fourth frame counter 23 which does not generate the read clock signal LT until a payload of VC-4 container is to be read out from the buffer 17. Furthermore, the third frame counter 22 informs the second detection circuit 21 when the areas Hi and H2 in the STM-1 frame occur. The second detection circuit 21 further receives from the buffer 17 the marker which denotes when a VC-4 container commences. The bytes of the areas HI and H2 are encoded in accordance with this marker.

In addition, there is a justification decision circuit 24 which decides when a negative or positive justification location occurs in the STM-1 frame. This information of the justification decision circuit 24 is applied to the second detection circuit 21. The occurrence of a positive or negative justification location is announced by the second detection circuit 21 to the third frame counter 22 which, on the basis of this information, starts the fourth frame counter 23 earlier or stops same. Furthermore, the third frame counter 22 controls the multiplexer or change-over switch 20 which receives the payload from the buffer 17 and the bytes of the areas Hi and H2 from the second detection circuit 21. In the case of a positive justification location the second detection circuit 21 additionally produces three bytes that do not contain any payload. In the case of a negative justification location payloads from the buffer 17 are delivered three bytes earlier. The third frame counter 22 additionally generates a clock signal, a frame clock signal and a row clock signal which are applied to the justification decision circuit 24. The duration of a row clock is equal to the duration of a row and the duration of a frame clock is equal to the duration of a frame and the duration of a clock signal is equal to the duration of four STM-1 frames. The justification decision circuit 24 further receives the justification information from the first detection circuit 13, denoting whether a positive, negative or no justification location is present.

The circuit elements 12 to 15 of the input circuit 11 and the circuit elements 21 to 23 of the output circuit 19 are constituted by processor building blocks which execute a program. In the following a schematically outlined program description is given for each circuit element 12 to 15 and 21 to 23:

First synchronizing circuit 12:
1. Detect the beginning of the STM-1 frame on the basis of data;
2. Set the first frame counter 14 to starting position once the beginning of a frame has been detected;

First frame counter 14:
1. When counter is in starting position, set count to zero;
2. Increment count by unity;
3. If VC-4 data or a negative justification location are present, start second frame counter 15;
4. If no VC-4 data or a positive justification location are present, stop second frame counter 15;
5. Inform the first detection circuit 13 of the beginning of the areas H1 and H2;

First detection circuit 13:
1. If areas H1 and H2 are present, determine their contents;
2. Inform the first frame counter 14 and also the justification decision circuit 24 whether a negative, positive or no justification location is present;
3. Start counting operation until the beginning of the VC-4 container is reached;
4. Once the beginning of the VC-4 container has been reached, send a marker to the buffer 15 and set second frame counter 15 to starting position;

Second frame counter 15:
1. When counter is in the starting position, set count to zero;
2. Once the start of the first frame counter 14 has been released, increment count by unity; otherwise maintain the old count;
3. Produce a clock of the write clock signal ST with each count increment;

Second detection circuit 21:
1. Form the areas H1, H2, H3 and a positive justification location as required on the basis of the marker from the buffer 17 and the justification decision of the justification decision circuit 24;
2. Inform the third frame counter 22 of the justification information and deliver the marker to the third frame counter 22;

Third frame counter 22:
1. Set the count to zero at the beginning of an STM-1 frame;
2. Increment count by unity;
3. Set the fourth frame counter 23 to starting position when a marker occurs;
4. When VC-4 data or a negative justification location are present, start the second frame counter 15;
5. If no VC-4 data or a positive justification location are present, stop the second frame counter 15;
6. Announce the beginning of the areas H1 and H2 to the second detection circuit;
7. Connect the output of buffer store 17 to the output of the multiplexer or change-over switch 20 when VC-4 data are present; Connect the output of the second detection circuit 21 to the output of the multiplexer or change-over switch 20 when areas H1, H-2 and H3 and a positive justification location are present;
8. Generate the clock signals and a stop signal for the justification decision circuit 24;

Fourth frame counter 23:

1. When counter is in starting position, set count to zero;
2. Once the start of the third frame counter 22 has been released, increment count by unity; otherwise maintain old count;
3. Produce one clock of the read clock signal LT with each count increment.

In the following a first exemplary embodiment of a justification decision circuit 24 will be explained with reference to FIG. 8. The write addresses of the write address generator 16 and the read addresses of the read address generator 18 are applied to a subtracter 25 which forms a difference value. When the buffer 17 is half full, the difference value produced by the subtracter 25 equals zero. The difference value is applied to an input of an adder 26. The other input of the adder 26 is supplied with an output signal of a low-pass filter 27. The low-pass filter 27 receives the justification decision from the first detection circuit 13. This justification decision is applied to an adder 28 included in the low-pass filter 27. The output values of the adder 28 are buffered in a register 29 to which a clock signal is supplied (period: 2 ms), and applied to a multiplier 30 and a multiplier 31. In the multiplier 31 the output signal of the register 29 is multiplied by a first factor whose value equals 15/16. This signal produced in the multiplier 31 is also fed back to the adder 28. In the multiplier 30 the output signal of the register 29 is multiplied by a second factor whose value is 1/16. The output values of the multiplier 30 represent the low-pass filtered values of the justification information of the detection circuit 13. The first and second factors in the multipliers 30 and 31 are selected in such a way that the low-pass filter 27 has a large time constant. The values combined in the adder 26 are applied to a second circuit section 32 of the justification decision circuit 24. The second circuit section 32 produces the justification signal which will not be produced until a positive or negative justification location is present.

When pointer actions (e.g. positive justification activities) frequently occur, the low-pass filter 27 realises a more uniform distribution of the justification activities over a specific period of time. As a result, an overflow of the buffer on the receiver side of the transmission system and thus data loss can be avoided.

Figure 9:
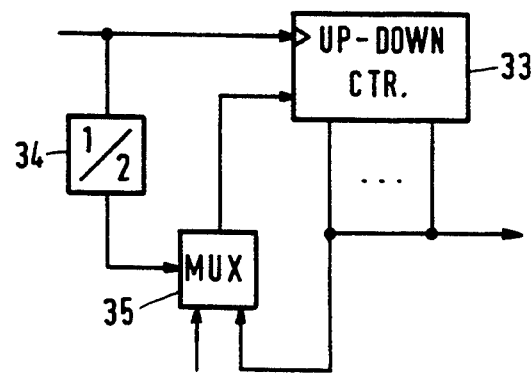

Another low-pass filter 27 is shown in FIG. 9. This low-pass filter comprises an up/down counter 33 whose clock input is supplied with, for example, a clock signal which may be produced by the third frame counter 22. This clock signal has a 0.25 ms period and thus has double the rate of the frame clock signal, whose period is 0.5 ms. The clock signal applied to the counter 33 is divided by two in a divider 34 and applied to a change-over switch 35. The output of the change-over switch is connected to the up/down input of the counter 33. An input of the change-over switch 35 receives the frame clock signal and the other input the sign of the counter 33. The counter outputs apply the low-pass filtered justification information signal to the detection circuit 13.

Figure 8:
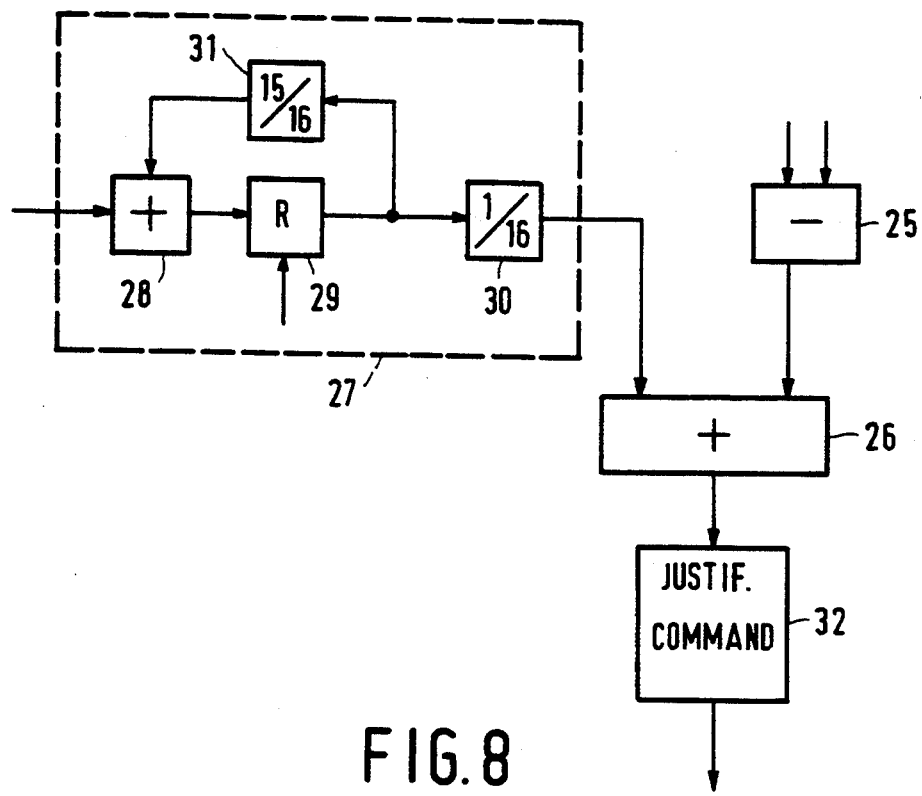

In FIGS. 8 and 9 the low-pass filter 27 performs a low-pass filtering of the pointer actions of the preceding adaptation circuit 8 (for example, in a preceding circuit 5). However, a low-pass filter may be arranged in the justification decision circuit 24 in such a way that it also takes the information about the phase difference between the read clock signal LT and the write clock signal ST into consideration.

Figure 10:
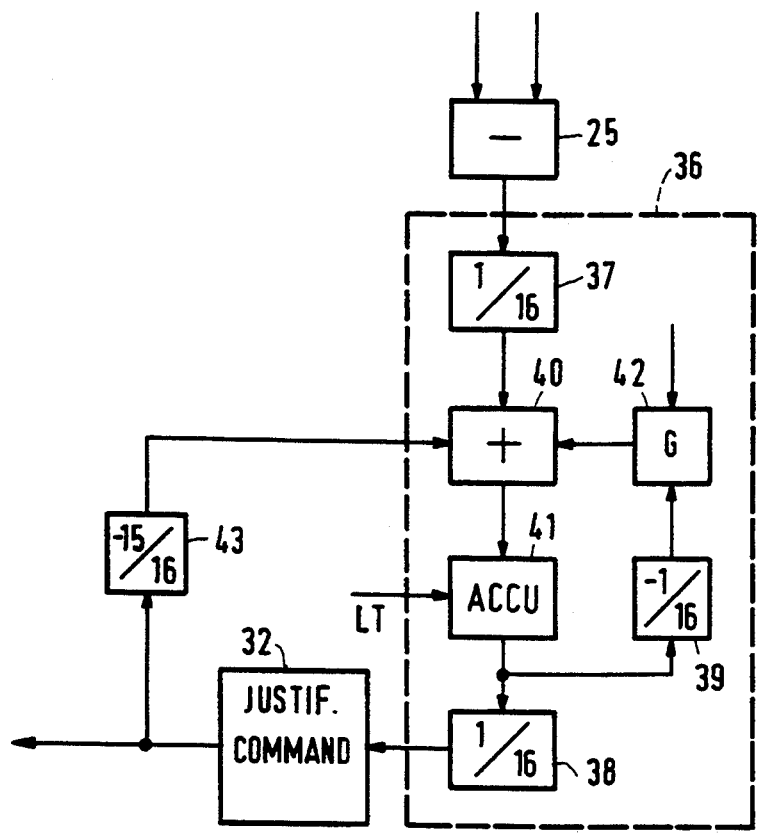

The subtracter 25 represented in FIG. 10 applies difference values to a low-pass filter 36 which filter comprises three multipliers 37, 38 and 39, an adder 40, an accumulator 41 and a gate circuit 42. The difference values produced by the subtracter 25 are multiplied in the multiplier 37 by a third factor whose value equals 1/16. In an adder 40 the output values of the multiplier 37 are added to further output values from other circuit elements. The output values of the adder 40 are accumulated in an accumulator 41. In the accumulator 41 an 11-bit shift is effected in the direction of most significant bit outputs (division by 2048). Thus, a mean value is calculated in the accumulator 41. The accumulator 41 is clocked with the read clock signal LT. The output of the accumulator 41 is connected to the multipliers 38 and 39. A multiplication by the negative third factor i.e. by a value of $-1/16$ is performed in the multiplier 39. The output value of the multiplier 39 is led through the gate circuit 42 to the adder 40 only every fourth frame. The gate circuit 42 is released by means of a clock signal whose period is four times the period of the frame clock signal. A multiplication of the output value of the accumulator 41 by the third factor is also performed in the multiplier 38. The output of the multiplier 38 supplies low-pass filtered values which are applied to the second circuit section 32 of the justification decision circuit 24. In response to the justification decision the result is multiplied by a fifth factor whose value equals $-5/16$ in a multiplier 43 and fed back to an input of the adder 40. The low-pass filtering affects the justification decision by way of the write and read address generators 16 and 18, which decision relates to the clock adaptation in the adaptation circuit 8. In order to reduce this influence with respect to the filtering, the feedback and multiplication are performed in the multiplier 43.

Figure 11:
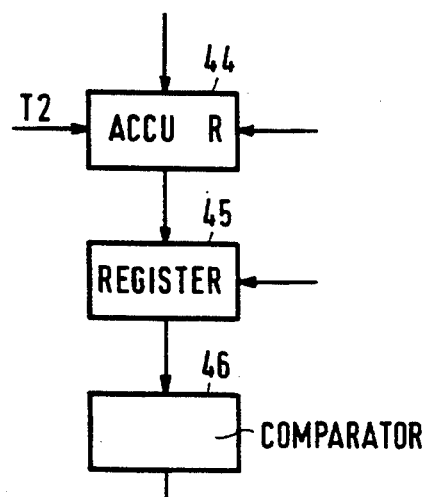

The second circuit section 16 can include only a single register, in that the signal present at its input is buffered in the register with a frame clock and, subsequently, a decision about a possible justification operation is made in a comparator. In order to avoid the low-frequency jitter which is especially felt on the receiver side of the transmission system, FIG. 11 shows a first embodiment for a second circuit section 32. An accumulator 44 receives the input values which are accumulated. For the exemplary embodiments shown in FIGS. 8 and 9 an accumulation is made over a specific period of time (calculation of mean value). From the embodiment shown in FIG. 10 the accumulator 44 may be omitted, because the mean value has already been calculated in the low-pass filter 36. An accumulation is performed with each clock of the read clock signal LT. The period of time is one row. After one row the accumulator 44 is reset to zero by a row clock signal. The result of the accumulation over one row is taken over by a register 45 at the end of a frame. This register is supplied with the frame clock signal. The period of time necessary for calculating a mean value is equal to the period of time of one row. However, only the last line of the frame is needed to calculate the mean value. This mean value is taken over in the register 45 at the end of a frame. In a comparator 46 following in the circuit the result stored in the register 45 is compared with a lower and a upper peak value. If the mean value is smaller than the lower peak value, a negative justification signal is produced and if the mean value is larger than the upper peak value, a positive justification signal is produced. The two peak values are selected in such a way that a sufficient adaptation of the signal to the read clock signal may be effected with the possible phase variations and the justification locations present (cf. CCITT Recommendation G. 783).

Figure 12:
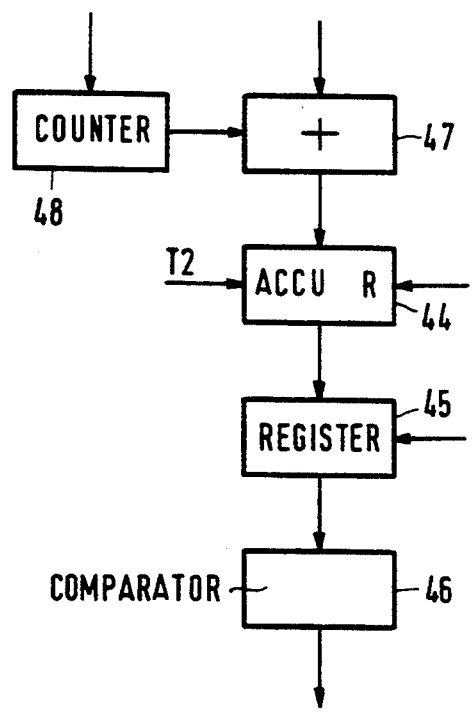

A further embodiment for a second circuit section 32 is shown in FIG. 12. The input values of the second circuit section 32 are applied to an adder 47. This adder receives further values from a counter 48 which is clocked by a frame clock signal. In this manner, there is a sawtooth-shaped variation of the output values of the counter 48 reckoned over a plurality of frame clocks. The output values of the adder 47 are applied to the accumulator 44 which accumulates the output values over one row. For the justification decision circuit 24 as shown in FIG. 10 the accumulator 44 is not necessary. The accumulation result is stored in the register 45 at the end of a frame by means of a frame clock signal. In the subsequent comparator 46, as is described in FIG. 11, it is decided whether a negative or positive justification signal is to be generated. With the second embodiment a further reduction of the low-frequency spectral portion in the jitter is realised.

Figure 13:
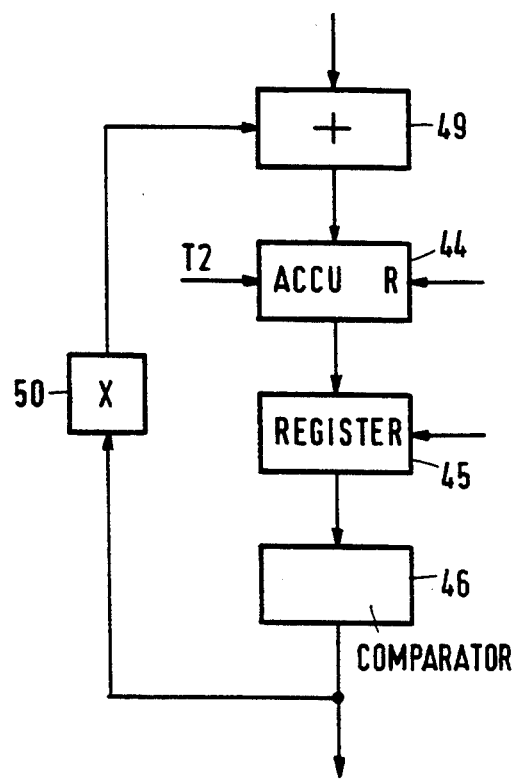

The low-frequency spectral portions in the jitter may be reduced most with the circuit arrangement to be described in the following with reference to FIG. 13. The input values of the second circuit section 32 are applied to an adder 49 which adds together each input value and a further output value coming from the multiplier 50. In the multiplier 50 the negative or positive justification signal produced by the comparator 46 is multiplied by a constant factor. The factor establishes a stabilization of the adaptation circuit 8 and is to be selected in such a way that, subsequent to a justification opportunity caused by a justification signal, the output value of the adder 49 relative to the input value of the second circuit section 32 is changed by a factor between 1 and 2. For example, the output value may be 2. Subsequently, as with the two circuit sections 32 shown in FIGS. 11 and 22, an accumulation is performed in the accumulator 44 (may be omitted in FIG. 10) and the value is stored in register 45. In this embodiment shown in FIG. 13 the two peak values of the comparator 46 should be one byte apart.

Figure 14A:
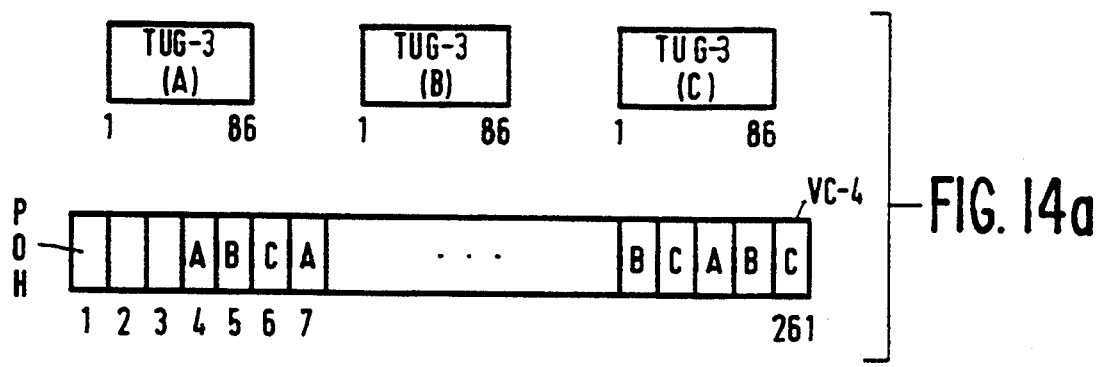

In the exemplary embodiment for an adaptation circuit 8 (FIGS. 4 and 5) described with reference to FIG. 7, a justification operation for a VC-4 container has been discussed. In addition thereto, a description will be given of an adaptation circuit 8 that provides justification operations for VC-12 containers. In the drawing FIGS. 14a to 14d the nesting of the VC-12 containers in a VC-4 container is shown. FIG. 14a shows a VC-4 container carrying three TUG-3 containers. The first frame of the VC-4 container carries the POH. The frames 2 and 3 carry informationless bytes and the next frames alternately carry frames of three TUG-3 containers. For example, the fourth frame of the VC-4 container carries the first frame of the first TUG-3 container, the fifth frame carries the first frame of the second TUG-3 container and the sixth frame carries the first frame of the third TUG-3 container.

Figure 14B:
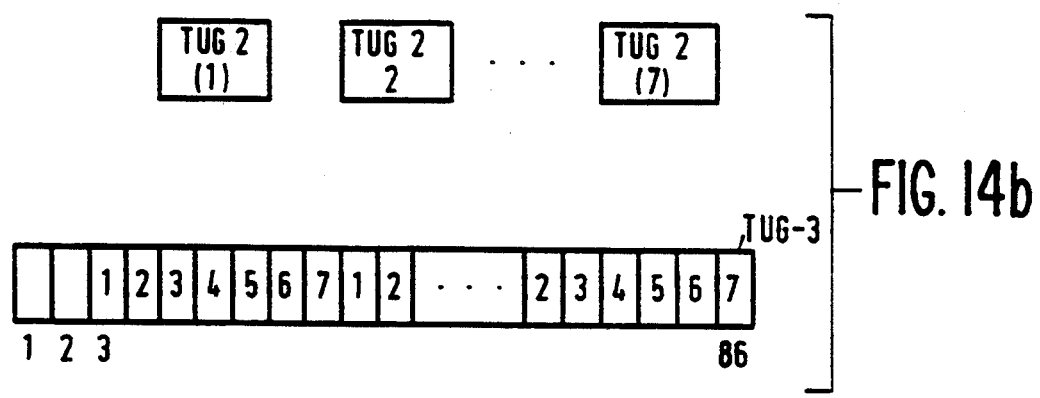
Figure 14C:
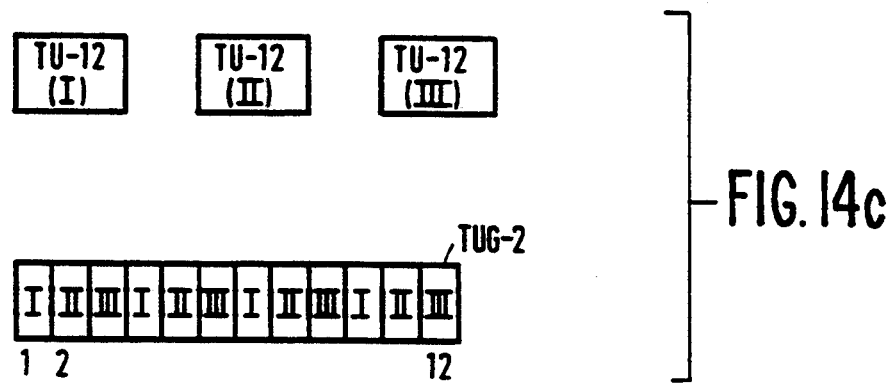
Figure 14D:
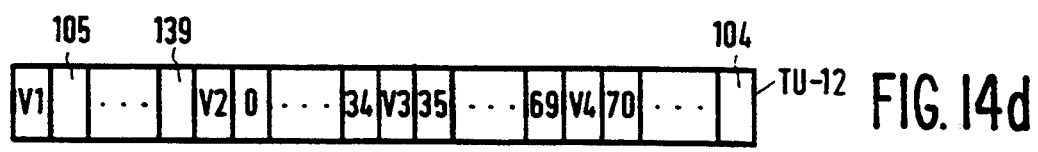

As shown in FIG. 14b a TUG-3 container consists of seven nested TUG-2 containers. In the TUG-3 container the first two frames are filled with informationless bytes, and the frames of the seven TUG-2 containers are alternately inserted into the subsequent frames. A TUG-2 container comprises three TU-12 containers. Frames of the three TU-12 containers are alternately inserted into the TUG-2 containers. A TU-12 container, compared with a VC-12 container, is completed by additional pointer bytes. As shown in FIG. 14d, a TU-12 container comprises four sub-units of 36 bytes each, a sub-unit carrying a pointer byte and 35 further bytes. In an STM-1 frame first the first sub-unit is inserted, in the next frame the second sub-unit, in the third frame the third sub-unit and in the fourth frame the fourth sub-unit is inserted. A positive justification location in the TU-12 container is the location referenced 35. The negative justification location is the pointer byte V3. A VC-12 container starts with the byte referenced V5. This byte might be found, for example, at the location referenced "0".

Figure 15:
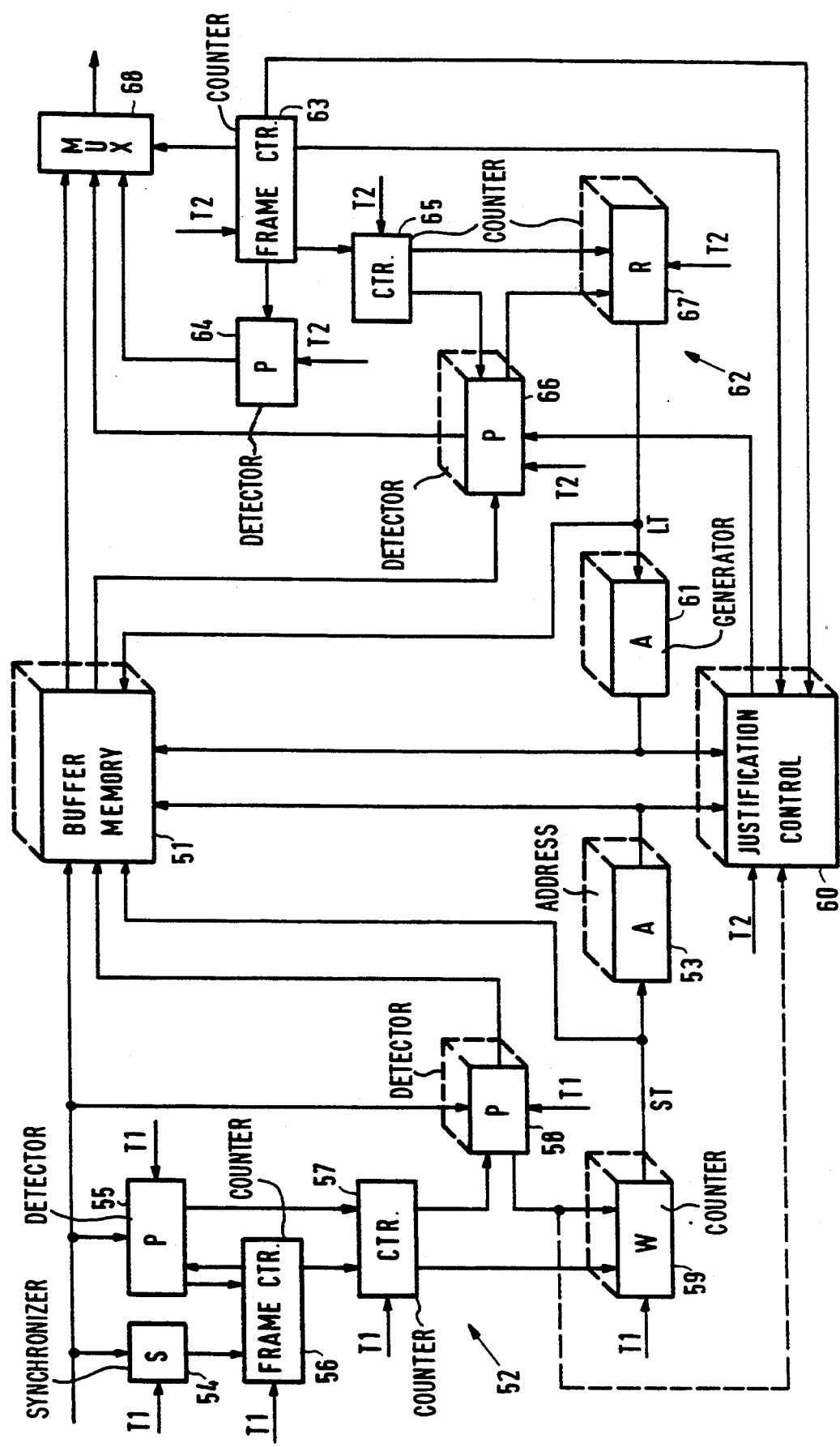
FIG. 15 shows a further exemplary embodiment of an adaptation circuit shown in FIG. 4 or 5.

An adaptation circuit 8 (FIGS. 4 and 5), suitable for justifying VC-12 containers, is represented in FIG. 15. Since 63 VC-12 containers are accommodated in one VC-4 container, a buffer 51 is available for each VC-12 container. Each writing operation of each buffer 51 is controlled by way of an input circuit 52 and write address generators 53. The input circuit 52 comprises a second synchronizing circuit 54, a third detection circuit 55, a fifth frame counter 56, a sixth frame counter 57, 63 first sub-detection circuits 58 and 63 first sub-frame counters 59. All the circuits 54 to 59 in the input circuit 52 receive the input clock signal T1. In the second synchronizing circuit 54 the beginning of the frame is detected on the basis of a plurality of bytes at the beginning of an STM-1 frame. Then the fifth frame counter 56 is started by the second synchronizing circuit 54. In the third detection circuit 55 it is established by detection of the areas H1 and H2 where the starting point of the VC-4 container lies. For this purpose the third detection circuit 55 is informed of the position of the areas H1, H2 by the fifth frame counter 56. If a detection of the areas H1 and H2 shows that a negative or positive justification location is present, the fifth frame counter 56 is informed of this fact by the third detection circuit 55. The fifth frame counter 56 starts and stops the sixth frame counter 57. The sixth frame counter 57 produces a clock signal for the first sub-frame counter 59. The sixth frame counter 57 does not produce a clock signal until data of the VC-4 container are present. The sixth frame counter 57 further informs the first sub- detection circuits 58 of the position in time of the bytes V1 to V4 of the VC-12 container and the position in time of an H4 byte in the POH of the VC-4 container. The H4 byte denotes which of the bytes V1 to V4 is present and the pointer bytes V1 and V2 denote the position of the V5 byte in a VC-12 container. The first sub- detection circuits 58 inform the allocated first sub- frame counters 59 of the beginning of a VC-12 container. Furthermore, by detecting the pointer bytes V1 and V2 it is determined whether negative or positive justification locations are present in a VC-12 container. The beginning of a VC-12 container is identified in each allocated buffer 51 by a marker of the allocated first sub- detection circuit 58.

The first sub- frame counters 59 produce write clock signals ST for each allocated buffer 51 and each allocated write address generator 53. A payload is written in the buffer 53 under the write address generated by a write address generator 53. The write address output of each write address generator 53 is connected to justification decision circuits 60. Read address generators 61 generating read addresses for the reading operation from a buffer 51 are allocated to each buffer 51 and each justification decision circuit 60. The read address generators 61 are controlled by means of a read clock signal LT from an output circuit 62.

The output circuit 62 comprises a seventh frame counter 63, a fourth detection circuit 64, an eighth frame counter 65, 63 second sub- detection circuits 66 and 63 second sub- frame counters 67. Each one of these circuits in the output circuit 62 receives an output clock signal T2. The seventh frame counter 63 starts and stops the eighth frame counter 65 which produces clock signals when data of the VC-4 container are to be read out. Furthermore, the seventh frame counter 63 denotes the position of the areas H1 and H2. The seventh frame counter 63 applies a frame clock signal and a stop signal also to the justification decision circuits 150. The justification decision circuits 60 are active for only one STM-1 frame and are stopped by the stop signal after 15 STM-1 frames. It should further be observed that from each first sub- detection circuit 58 a justification bit is applied to the allocated justification decision circuit 60, which bit is low-pass filtered, for example, in a low-pass filter 27 as shown in FIG. 8. The stop signal may then avoid that the second sub- detection circuits 66 are supplied with a justification signal.

The fourth detection circuit 64 applies the bytes of the areas H1 and H2 to a multiplexer or change-over switch 51 and denotes the beginning of a VC-4 container. The fourth detection circuit 64 informs the eighth frame counter 65 of the beginning of a VC-4 container, which container is always positioned at the same location because the TU-12 container only comprises justification locations. The eighth frame counter 65 applies a clock signal to the second sub- frame counters 67 which produce the read clock signals ST for the read address generators 61. Furthermore, the eighth frame counter 65 informs the second sub- detection circuits 66 of the position in time of the pointer bytes V1 to V4. The justification decision circuits 60 represented in the FIGS. 8 to 13 apply the justification signal to the second sub- detection circuits 66. It should further be observed that the period of time taken by the averaging, i.e. a period of time of an accumulation, corresponds to the period of time of an STM-1 frame. The second sub-detection circuits 66 decide on the basis of the justification signals whether a negative or a positive justification location is the present TU12 containers. Such a justification location is then announced to the second sub-frame counters 67 which then start producing a read clock signal LT at an earlier or later moment. The second sub-detection circuits 66 apply the pointer bytes V I to V4 to the multiplexer or changeover switch 68. Furthermore, the change-over switch 68 receives the payloads or data respectively, from the buffers 51. The multiplexer or change-over switch 68 is controlled by means of the seventh frame counter 63.

Also in the exemplary embodiment of an adaptation circuit 8 as shown in FIG. 15 the circuit elements 54 to 59 of the input circuit 52 and the circuit elements 63 to 67 of the output circuit 62 comprise processor building blocks which execute a fixedly stored program.

In the following a diagrammatically outlined program routine is shown for each circuit element 54 to 59 and 63 to 67:

Second synchronizing circuit 54:
1. Determine the beginning of the STM-1 frame on the basis of data;
2. Set fifth frame counter 56 to starting position when beginning of frame has been recognized;

Fifth frame counter 56:
1. When counter is in starting position, set count to zero;
2. Increment count by unity;
3. When VC-4 data or a negative justification location (VC-4 container) are present, start sixth frame counter 57;
4. If no VC-4 data or a positive justification location (VC-4 container) are present, stop the sixth frame counter 57;
5. Inform the third evaluation circuit 55 of the beginning of the areas H1 and H2;

Third detection circuit 55:
1. If areas H1 and H2 are present, determine their contents;
2. Inform the fifth frame counter 56 of the fact whether a justification location and which location is present (VC-4 container);
3. Start counting operation until the beginning of the VC-4 container is reached;
Once the beginning of the VC-4 container has been reached, set fifth frame counter 56 to starting position;

Sixth frame counter 57:
1. When counter is in starting position, set count to zero;
2. When start of the fifth frame counter 56 has been released, increment count by unity; otherwise maintain old count;
3. Apply a clock signal to the first sub- frame counter 59 with each count increment;
b 4. Inform the first sub- detection circuits 58 of the position in time of the pointer bytes V1 to V4 of the VC-12 containers and of the byte H4 in the POH of the VC-4 container;
5. Inform the first sub- detection circuits 58 of the fact whether data of the allocated VC-12 container are present;

First sub- detection circuits 58:
1. Determine the contents of the pointer bytes V1 and V2;
2. Inform the allocated first sub- frame counters 59 of the beginning of a VC-12 container; set the count of the allocated first sub- frame counter 59 to starting position;
3. Once the beginning of a VC-12 container has been reached, send marker to the allocated buffer 51;
4. If data of the allocated VC-12 container or a negative justification location are present, start the allocated first sub- frame counter 59;
5. If no data of the allocated VC-12 container or no positive justification location are present, stop the allocated first sub- frame counter 59;
6. Inform the allocated justification decision circuit 60 whether a negative, positive or no justification location is present;

First sub- frame counter 59:
1. When counter is in starting position, set count to zero;
2. If start of allocated first sub- detection circuit 58 has been released, increment count by unity, otherwise maintain old count;
3. Produce a clock of the write clock signal ST with each count increment;

Seventh frame counter 58:
1. Set count to zero at the beginning of an STM-1 frame;
2. Increment count by unity;
3. Set the eighth frame counter 65 to starting position at the beginning of the VC-4 frame and inform the fourth detection circuit 64 of this fact;

4. If data of the VC-4 container are present, start the eighth frame counter 65;

5. If no data of the VC-4 container are present, stop the eighth frame counter 65;

6. Inform the fourth detection circuit 64 of the beginning of the areas H1 and H2;

7. Connect output of a buffer 51 to the output of the change-over switch 68 if data of the allocated VC-12 container are present; Connect output of the fourth detection circuit 64 to the output of the multiplexer or change-over switch 68 if areas H1, H2 and H3 are present; Connect output of a second sub- detection circuit 66 to the output of the multiplexer or change-over switch 68 if the pointer bytes V1 to V4 and the area H4 are present;

8. Produce a frame clock and a row clock signal for the justification decision circuits 60;

Fourth detection circuit 64:

1. Form areas H1, H2 and H3 on the basis of the information of the seventh frame counter 58 about the beginning of the VC-4 frame;

Eighth frame counter 65:

1. When counter is in starting position, set count to zero;

2. When start of the seventh frame counter 58 has been released, increment count by unity; otherwise maintain old count;

3. Apply a clock of the clock signal to the second sub-frame counter 67 with each count increment;

4l. Inform the second sub- detection circuits 66 of the position in time of the pointer bytes V1 to V4 of the VC-12 container and of the byte H4 in the POH of the VC-4 container;

5. Inform the second sub- detection circuits 66 of the fact whether data of the allocated VC-12 container are present;

Second sub- detection circuits 66:

1. Form the contents of the pointer bytes V1 to V4 and also a positive justification location on the basis of the marker from the allocated buffer 51 and the justification decision from the allocated justification decision circuit 60;

2. Inform the allocated second sub- frame counter 67 of the marker;

3. If data of the allocated VC-12 container are to be read out or a negative justification location is present, start the allocated second sub- frame counter 67;

4. If no data of the allocated VC-12 container are to be read out, or a positive justification location is present, stop the allocated second sub- frame counter 67;

Second sub- frame counter 67:

1. If marker is present (counter starting position), set count to zero;

2. When start of second sub- detection circuit 66 has been released, increment count by unity; otherwise maintain old count;

3. Produce a clock of the read clock signal ST with each count increment.

It should further be observed that a plurality of lines have partly been represented as one line for clarity.

I claim:

1. A transmitter for synchronous digital signals to be transmitted as a series of containers, comprising a buffer into which newly arrived data for one of said containers are written, and from which stored data for said one container are read, a write address generator and a read address generator, for respectively providing write addresses and read addresses of locations in the buffer where said newly arrived data are to be written and said stored data are to be read, respectively, means for detecting the presence of positive and negative justification locations in said newly arrived data, and generating location presence signals responsive to detection of presence of such locations, an output circuit receiving said stored data read from said buffer, and a justification decision circuit comprising subtractor means for determining a difference between said write addresses and said read addresses; low-pass filter means receiving said location presence signals, and providing a low-pass filtered location presence value; and means for combining said difference and said low-pass filtered location presence value, and forming a justification signal based thereon, responsive to said justification signal, said output circuit inserting justification locations in said stored data read from said buffer.

2. A transmitter as claimed in claim 1, wherein said one container comprises at least one frame transmitted over a frame time interval, characterized in that said low-pass filter means comprises an adder, means for buffering an added signal from said adder at least once per four-frame time interval to produce a buffered output, and first and second multipliers receiving said buffered output; said adder adding said location presence signals and an output of said first multiplier to form said added signal; and said second multiplier providing said low-pass filtered value.

3. A transmitter as claimed in claim 2, characterized in that said means for combining comprises means for accumulating said low-pass filtered and said difference values over a given time for calculating a mean value, and means for comparing said mean value with a lower and an upper peak value; responsive to said mean value being smaller than the lower peak value, said justification signal having a negative value for forming a negative justification location; and responsive to said mean value being largerer than the upper peak value, said justification signal having a positive value for forming a positive justification location.

4. A transmitter as claimed in claim 1, wherein said one container comprises at least one frame transmitted over a frame time interval, characterized in that said low-pass filter means comprises an up-down counter which makes a count at least once per two-frame time interval, in which the counting direction during one time interval depends on said location presence signals, and during another time interval depends on the sign of the counter output, said counter output being said low-pass filtered value.

5. A transmitter as claimed in claim 4, characterized in that said means for combining comprises means for accumulating said low-pass filtered and said difference values over a given time for calculating a mean value, and means for comparing said mean value with a lower and an upper peak value; responsive to said mean value being smaller than the lower peak value, said justification signal having a negative value for forming a negative justification location; and responsive to said mean value being largerer than the upper peak value, said justification signal having a positive value for forming a positive justification location.

6. A transmitter as claimed in claim 1, characterized in that said means for combining comprises means for accumulating said low-pass filtered and said difference values over a given time for calculating a mean value, and means for comparing said mean value with a lower and an upper peak value; responsive to said mean value being smaller than the lower peak value, said justification signal having a negative value for forming a negative justification location; and responsive to said mean value being larger than the upper peak value, said justification signal having a positive value for forming a positive justification location.

7. A transmitter as claimed in claim 6, characterized in that said means for accumulating additionally accumulates values of a cyclic number sequence or a random sequence.

8. A transmitter as claimed in claim 6, characterized in that said subtractor provides a zero subtraction result when said buffer is half full; said justification further comprises means for multiplying negative and positive justification signals by a factor; and said means for accumulating additionally accumulates at least one value multiplied by said factor.

9. A transmitter as claimed in claim 6, wherein data in each container is arranged in rows defining a row interval, characterized in that said given time is an integer multiple of a row or frame interval, said integer having a value greater than zero.

10. A transmitter as claimed in claim 1, characterized by comprising a plurality of said buffers, said write and read generators and said justification decision circuits, the number of said plurality being equal to the number of said containers in said series provided for inserting justification locations.

11. A transmitter as claimed in claim 1, wherein said synchronous digital signals are STM-N signals, further comprising an input circuit for receiving said newly arrived data, characterized in that said input circuit produces a write clock signal based on an input clock signal for said write address generator, said input clock signal being derived from said STM-N signal, responsive only to presence of said newly arrived data of a container allocated to said write address generator.

12. A transmitter as claimed in claim 1, comprising an oscillator for said read address generator, characterized in that said output circuit produces a read clock signal based on an output clock signal generated by said oscillator, for producing read clock pulses responsive only to presence of said stored data in said buffer allocated to said read address generator.

13. A transmitter as claimed in claim 12, characterized in that responsive to receipt of a negative justification signal, said output circuit produces an additional read clock signal for reading said stored data; and responsive to receipt of a positive justification signal, said output circuit interrupts production of said read clock signals.

14. A transmitter for synchronous digital signals to be transmitted as a series of containers, comprising
a buffer into which newly arrived data for one of said containers are written, and from which stored data for said one container are read,
a write address generator and a read address generator, for respectively providing write addresses and read addresses of locations in the buffer where said newly arrived data are to be written and said stored data are to be read, respectively,
an output circuit receiving said stored data read from said buffer, and
a justification decision circuit comprising subtractor means for determining a difference between said write addresses and said read addresses; low-pass filter means receiving said difference, and providing a low-pass filtered difference value based directly on said difference between said write addresses and said read addresses, wherein a difference determined at a later instant has a greater effect on said low-pass difference value than a difference determined at an earlier instant and means for forming a justification signal based on said low-pass filtered difference value,
responsive to said justification signal, said output circuit inserting justification locations between said stored data read from said buffer.

15. A transmitter for synchronous digital signals to be transmitted as a series of containers, comprising
a buffer into which newly arrived data for one of said containers are written, and from which stored data for said one container are read, wherein said one container comprises at least one frame transmitted over a frame time interval,
a write address generator and a read address generator, for respectively providing write addresses and read addresses of locations in the buffer where said newly arrived data are to be written and said stored data are to be read, respectively,
an output circuit receiving said stored data read from said buffer, and
a justification decision circuit comprising subtractor means for determining a difference between said write addresses and said read addresses,
characterized in that said justification decision circuit further comprises low-pass filter means receiving said difference and comprising an accumulator having an accumulator output, an adder, and first and second multipliers, and providing a low-pass filtered difference value; and means for forming a justification signal based on said low-pass filtered difference value, and wherein
said first multiplier receives and multiplies said difference by a first factor to form a first multiplied signal,
said second multiplier multiplies said accumulator output by the negative of said first factor for providing a feedback signal to said adder at least once per four-frame time interval during the forming of a read address, and
said adder receives and adds said feedback signal and said first and second multiplied signals, to form an adder output which is supplied to said accumulator,
responsive to said justification signal said output circuit inserting justification locations between said stored data read from said buffer.

16. A transmitter as claimed in claim 15, characterized in that the justification decision circuit further comprises a feedback circuit including a third multiplier,
said third multiplier receiving said justification signal, multiplying said justification by a third factor to form a feedback signal, and providing said feedback signal to said adder.

17. A transmitter for synchronous digital signals to be transmitted as a series of containers, comprising a buffer into which newly arrived data for one of said containers are written, and from which stored data for said one container are read, a write address generator and a read address generator, for respectively providing write addresses and read addresses of locations in the buffer where said newly arrived data are to be written and said stored data are to be read, respectively, an output circuit receiving said stored data read from said buffer, and a justification decision circuit comprising subtractor means for determining a difference between said write addresses and said read addresses, characterized in that said justification decision circuit further comprises low-pass filter means receiving said difference and providing a low-pass filtered difference value based directly on said difference between said write addresses and said read addresses; and means for forming a justification signal based on said low-pass filtered difference value, said means for forming comprises means for accumulating said low-pass filtered difference value and values of said difference over a given time for calculating a mean value, and means for comparing said mean value with a lower and an upper peak value; responsive to said mean value being smaller than the lower peak value, said justification signal having a negative value for forming a negative justification location; and responsive to said mean value being larger than the upper peak value, said justification signal having a positive value for forming a positive justification location responsive to said justification signal, said output circuit inserting justification locations between said stored data read from said buffer.

18. A transmitter as claimed in claim 17, characterized in that said means for accumulating additionally accumulates values of a cyclic number sequence or a random sequence.

19. A transmitter as claimed in claim 17, characterized in that said subtractor provides a zero subtraction result when said buffer is half full; said justification decision circuit further comprises means for multiplying negative and positive justification signals by a factor; and said means for accumulating additionally accumulates at least one value multiplied by said factor.

20. A transmitter as claimed in claim 19, wherein said one container comprises at least one frame transmitted over a frame time interval, characterized in that said low-pass filter means further comprises an adder, and first, second and third multipliers, and justification command means, said third multiplier multiplies an output of said accumulator by a first factor to provide a multiplied signal to said justification command means, responsive to presence of a positive or a negative justification location in said newly arrived data, said justification command means provides said justification signal, said second multiplier multiplies said means for accumulating output by the negative of said first factor for providing a feedback signal to said adder at least once per four-frame time interval, said first multiplier receives and multiplies said difference by a first factor to form a first multiplied signal, said means for multiplying negative and positive justification signals multiplies said justification signal by a second factor to form a second multiplied signal, and said adder receives and adds said feedback signal and said first and second multiplied signals, to form an adder output which is supplied to said means for accumulating.

21. A transmitter as claimed in claim 17, wherein data in each container is arranged in rows defining a row interval, characterized in that said given time is an integer multiple of a row or frame interval, said integer having a value greater than zero.

22. A transmitter as claimed in claim 17, characterized in that said transmitter further comprises a plurality of said buffers, said write and read generators and said justification decision circuits, the number of said plurality being equal to the number of said containers in said series provided for inserting justification locations.

23. A transmitter as claimed in claim 17, wherein said synchronous digital signals are STM-N signals, further comprising an input circuit for receiving said newly arrived data, characterized in that said input circuit produces a write clock signal based on an input clock signal for said write address generator, said input signal being derived from said STM-N signal, responsive only to presence of said newly arrived data of a container allocated to said write address generator.

24. A transmitter as claimed in claim 17, comprising an oscillator for said read address generator, characterized in that said output circuit produces a read clock signal based on an output clock signal generated by said oscillator, for producing read clock pulses responsive only to presence of said stored data in said buffer allocated to said read address generator.

25. A transmitter as claimed in claim 24, characterized in that responsive to receipt of a negative justification signal, said output circuit produces an additional read clock signal for reading said stored data; and responsive to receipt of a positive justification signal, said output circuit interrupts production of said read clock signals.

* * * * *